United States Patent [19]

Hirosaki

[11] Patent Number: 4,661,945
[45] Date of Patent: Apr. 28, 1987

[54] DIFFERENTIAL CODING SYSTEM AND APPARATUS THEREFOR

[75] Inventor: Botaro Hirosaki, Tokyo, Japan
[73] Assignee: NEC Corporation, Tokyo, Japan
[21] Appl. No.: 625,054
[22] Filed: Jun. 26, 1984
[30] Foreign Application Priority Data Jun. 27, 1983 [JP] Japan .................................. 58-115535

[51] Int. Cl.⁴ ........................ H04J 11/00; H04B 14/06
[52] U.S. Cl. ............................................ 370/20; 375/27
[58] Field of Search ...................... 370/20; 375/38, 39, 375/27; 455/60

[56] References Cited
U.S. PATENT DOCUMENTS 3,710,257  1/1973  Low et al. ............................. 370/20
3,732,375  5/1973  Kuribayashi .......................... 370/20
4,520,490  5/1985  Wei ....................................... 375/27

OTHER PUBLICATIONS

IEEE Transactions on Communications, vol. COM 23, No. 2, Mar. 1975; "The Performance of Staggered Quadrature Amplituoe Modulation in the Presence of Phase Jitter", Gitlin et al.

Primary Examiner—Douglas W. Olms
Assistant Examiner—Frank M. Scutch, III
Attorney, Agent, or Firm—Sughrue, Mion, Zinn, Macpeak, and Seas

[57] ABSTRACT

A differential coding system applicable to a staggered quadrature amplitude modulation transmission system is disclosed. Even when ambiguities with respect to phase and time have developed in combination in the transmission system, the differential coding system performs differential coding with ease and, thereby, faithfully regenerates an original data code sequence.

3 Claims, 8 Drawing Figures

Fig. 2A

| IN-PHASE | $a_1$ | $a_2$ | $a_3$ | $a_4$ | $a_5$ | $a_6$ | --- | ~200 |
|---|---|---|---|---|---|---|---|---|
| QUADRATURE | $b_1$ | $b_2$ | $b_3$ | $b_4$ | $b_5$ | $b_6$ | --- | ~202 |

Fig. 2B

| IN-PHASE | $-b_1$ | $-b_2$ | $-b_3$ | $-b_4$ | $-b_5$ | $-b_6$ | --- | ~204 |
|---|---|---|---|---|---|---|---|---|
| QUADRATURE | $a_2$ | $a_3$ | $a_4$ | $a_5$ | $a_6$ | $a_7$ | --- | ~206 |

Fig. 2C

| IN-PHASE | $b_1$ | $b_2$ | $b_3$ | $b_4$ | $b_5$ | $b_6$ | --- | ~208 |
|---|---|---|---|---|---|---|---|---|
| QUADRATURE | $-a_2$ | $-a_3$ | $-a_4$ | $-a_5$ | $-a_6$ | $-a_7$ | --- | ~210 |

Fig. 2D

| IN-PHASE | $-a_1$ | $-a_2$ | $-a_3$ | $-a_4$ | $-a_5$ | $-a_6$ | --- | ~212 |
|---|---|---|---|---|---|---|---|---|
| QUADRATURE | $-b_1$ | $-b_2$ | $-b_3$ | $-b_4$ | $-b_5$ | $-b_6$ | --- | ~214 |

DIFFERENTIAL CODING SYSTEM AND APPARATUS THEREFOR

BACKGROUND OF THE INVENTION

The present invention relates to a differential coding system and, more particularly, to a differential coding system applicable to a staggered quadrature amplitude modulation transmission system and an apparatus therefor.

Generally, a differential coding system regards a transmission line code as a kind of state and decides a state at the next time instant based on a current state and a current original data code, employing the resultant data sequence as a transmission code sequence. This method has been extensively used for the purpose of faithfully regenerating an original code sequence at the receiver side, even if state ambiguity exists in the transmission line, by observing a sftate transition only.

Typical examples of state ambiguity in the transmission system are the polarity ambiguity in the one-dimensional signal and the quadrant ambiguity in the two-dimensional signal. Differential coding effectively applicable to such simple ambiguities may be found by a method which is intuitively obvious. However, concerning a staggered quadrature amplitude modulation (SQAM) system which involves combined ambiguity of time ambiguity and phase ambiguity, it has been considered difficult to adopt differential coding therefor. For details of SQAM, a reference may be made to the paper entitled "Performance of Staggered Quadrature Amplitude Modulation in the Presence of Phase Jitter", IEEE Transactions on Communicaions, Vol. COM-23, No. 3, March, 1975.

As has been pointed out, SQAM signals have various advantageous features such as immunity to jitter and small peak power. It has also been pointed out that a so-called QAM transmission system which is strong to transmission distortion and impuse noise and high in frequency utilization efficiency is obtainable by orthogonally multiplexing a plurality of SQAM signals by use of a plurality carriers having different frequencies. Despite those outstanding advantages of SQAM, the number of transmission apparatuses heretofore realized with SQAM is distressingly small. Such a situation is due mainly to the fact that differential encoding has generally been believed impracticable when it comes to SQAM, as previously stated.

SUMMARY OF THE INVENTION

It is therefore an object of the present invention to provide a differential coding system and apparatus therefor which realizes application of differential coding to the SQAM transmission system which has heretofore appeared almost hopeless.

It is another object of the present invention to provide a generally improved differential encoding system and apparatus therefor.

In one aspect of the present invention, in a differential coding system for a staggered quadrature amplitude modulation transmission system which transmits and receives a first data sequence $a_1, a_2, \ldots, a_k, \ldots$ and a second data sequence delayted half a clock period relative to the first data sequence, $b_1, b_2, \ldots, b_k, \ldots$, by assigning the first and second data sequences to an in-phase channel and a quadrature channel, respectively, there is provided the improvement wherein the two data sequences are regarded as a single data sequence, $a_1, b_1, a_2, b_2, \ldots, a_k, b_k, \ldots$, and the single data sequence is further regarded as a state transition sequence, $(a_1, b_1) \rightarrow (b_1, a_2) \rightarrow (a_2, b_2) \rightarrow \ldots \rightarrow (a_k, b_k) \rightarrow \ldots$, and a data source code is assigned to a state transition between two consecutive states in conformity to a predetermined relation.

In another aspect of the present invention, there is provided a differential encoder for entering an m-bit codeword in every T/2 seconds as original data and transforming the codeword into two different m-bit codeword sequences which occur at every T seconds, comprising a state circuit supplied with m-bit original data, which is obtained at the every T/2 seconds, as a first input and an output m-bit codeword as a second input which is output from the sftate circuit, and a delay circuit for delaying the output m-bit codeword by T/2 seconds to produce m-bit codeword and supplying the m-bit codeword to the state circuit as a third input, the state circuit being constructed to develop as the output m-bit codeword an m-bit pattern conforming to a relation which is predetermined by a bit pattern of "3 m" bits in total which is determined at every T/2 seconds from the first, second and third inputs.

In another aspect of the present invention, there is provided a differential decoder for receiving a first m-bit codeword sequence and a second m-bit codeword sequence generated at every T seconds and transforming the first and second codeword sequences into an m-bit original data codeword sequence which occurs at every T/2 seconds, comprising: a multiplexer for multiplexing the first and second m-bit codeword sequences according to a predetermined T/2 seconds delay relation to output a multiplexed codeword sequence as a first m-bit codeword sequence which occurs at every T/2 seconds, a first delay circuit for delaying the first m-bit codeword sequence by T/2 seconds to output a second m-bit codeword sequence, a second delay circuit for delaying the second m-bit codeword sequence by T/2 seconds to output a third m-bit codeword sequence, and a state circuit for developing at every T/2 seconds an m-bit codeword according to a predetermined relation to a 3 m-bit input bit pattern which, assuming that the first, second and third m-bit codeword sequences as first, second and third input sequences, respectively, is determined at every T/2 seconds in the first, second and third input sequences.

In accordance with the present invention, a differential coding system applicable to a staggered quadrature amplitude modulation transmission system is disclosed. Even when ambiguities with respect to phase and time have developed in combination in the transmission system, the differential coding system performs differential coding with ease and, thereby faithfully regenerates an original data code sequence.

The above and other objects, features, and advantages of the present invention will become apparent from the following detailed description taken with the accompanying drawings.

BRIEF DESCRIPTION OF THE DRAWINGS

FIGS. 2A–2D are timing charts useful for describing ambiguity elements particular to the SQAM transmission system;

DESCRIPTION OF THE PREFERRED EMBODIMENT

While the differential coding system and apparatus therefor of the present invention is susceptible of numerous physical embodiments, depending upon the environment and requirements of use, a substantial number of the herein shown and described embodiment has been made, tested and used, and all have performed in an eminently satisfactory manner.

Figure 1A:
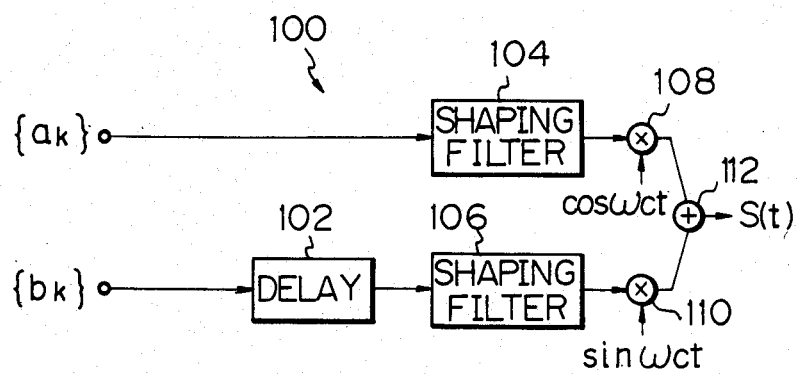
FIGS. 1A and 1B are block diagrams representative of a construction generally employed with an SQAM transmission system.
Figure 1B:
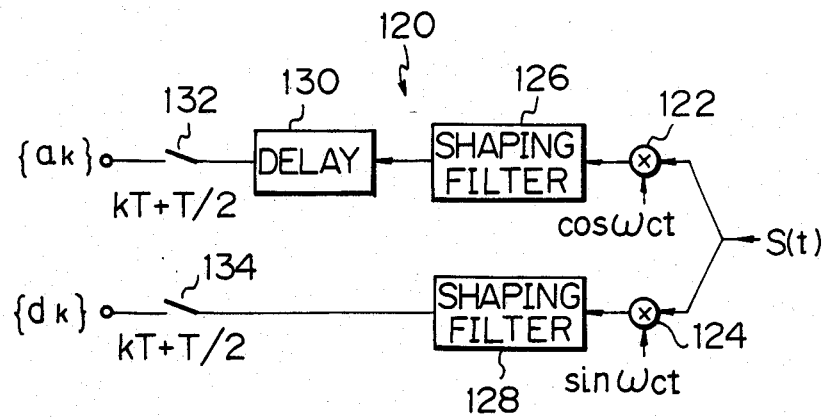

Referring to FIGS. 1A and 1B of the drawings, there are shown respectively a general construction of a transmitter and that of a receiver in an SQAM transmission system. The transmitter, generally 100, comprises a delay circuit 102 for developing half a clock period of delay, shaping filters 104 and 106 each for shaping a baseband waveform, multipliers 108 and 110 for governing modulation, and an adder 112. On the other hand, the receiver, generally 120, comprises multipliers 122 and 124 for governing demodulation, shaping filters 126 and 128, a delay circuit 130, and samplers 132 and 134.

As shown in FIG. 1, a first data sequence $\{a_k\}$ generated in the transmitter 100 is applied to the shaping filter 104 for baseband shaping and, then, sent out to a transmission line as an in-phase signal via the multiplier 108. Meanwhile, a second data sequence $\{b_k\}$ is delayed by half a clock period by the delay circuit 102 and, thereafter, routed to the transmission line as a quadrature signal via the shaping filter 106 and multiplier 110 in this order. In this construction, assuming that the impulse response of the shaping filters 104 and 106 is g(t), the signal s(t) appearing at the transmission line is expressed as:

$$s(t) = \sum_k a_k g(t - kT) \cos w_c t + \sum_k a_k g\left(t - kT - \frac{T}{2}\right) \sin w_c t$$

where $W_c$ is the carrier angular frequency.

In the receiver 120, the signal s(t) coming in over the transmission line is applied to the multipliers 122 and 124. Here, let it be assumed that the shaping filters 126 and 128 allow only the low frequency range components of outputs of their associated multipliers to pass therethrough. Then, the outputs of the filters 126 and 128 are produced respectively by $$\sum_k a_k g(t - kT)$$

and $$\sum_k b_k g\left(t - kT - \frac{T}{2}\right)$$

It follows from the above that, when an output of the delay 130 which is a delayed version of the output of the filter 126 by T/2 seconds is sampled by the sampler 132 at a time kT+T/2, the first data sequence $\{a_k\}$ from the transmitter 100 will be regenerated as the in-phase data sequence. The second data sequence $\{b_k\}$ from the transmitter 100, on the other hand, is regenerated as the quadrature data sequence by sampling an output of the filter 128 at time kT+T/2. Let g(t) be the waveform response which satisfies the so-called Nyquist condition that is sampled value g(kT) at every T seconds is "1" if k=0 and "0" if otherwise.

In the SQAM transmission system of the type described, assume that the demodulated carrier phase at the receiver 120 is advanced by $\pi/2$ compared to one at the transmitter 100. Then, the in-phase carrier applied to the multiplier 122 is $-\sin w_c t$ and the quadrature carrier applied to the multiplier 124 is $\cos w_c t$. Therefore, outputs of the filters 126 and 128 are produced respectively by:

$$-\sum_k b_k g\left(t - kT - \frac{T}{2}\right)$$

and $$\sum_k a_k g(t - kT)$$

Consequently, the input signals to the samplers 132 and 134 are expressed respectively as:

$$-\sum_k b_k g(t - kT - T)$$

and $$\sum_k a_k g(t - kT)$$

Shifting the previously mentioned sampling time kT+T/2 by T/2 to kT+T gives the in-phase data and the orthogonal data respectively as:

$$-b_1, -b_2, \ldots$$

and $$a_2, a_3, \ldots$$

Such samples that strain develops not only in phase but also in time between the in-phase and quadrature data.

In the SQAM transmission system, four different kinds of ambiguity exist with respect to phase and time. By use of a carrier phase deviation $\theta$ and a sampling timing deviation $\tau$ at the receiver 120, the four ambiguity elements may be expressed as $(\theta, \tau) = (0, 0)$, $(\pi/2, T/2)$, $(-\pi/2, T/2)$, $(\pi, 0)$.

FIGS. 2A–2D show respectively in-phase data sequences and quadrature data sequences which result from the aambiguity elements mentioned above. In FIG. 2A, the reference numeral 200 designates as in-phase data sequence and 202, a quadrature data sequence, each developing when $(\theta, \tau) = (0, 0)$. In FIG. 2B, the reference numerals 204 and 206 designate respectively an in-phase data sequence and a quadrature data sequence developing when $(\theta, \tau) = (\pi/2, T/2)$. In FIG. 2C, the reference numerals 208 and 210 designate respectively an in-phase data sequence and an othogonal data sequence developing when $(\theta, \pi) = (-\pi/2, T/2)$. Further, in FIG. 2D, the reference numerals 212 and 212 designae respectively an in-phase data sequence and a quadrature data sequence provided by $(\theta, \tau) = (\pi, 0)$. In the SQAM system, as will be apparent from FIGS. 2A–2D, where a set of in-phase data $X_k$ and quadrature data $Y_k$ at a time k, $(X_k, Y_k)$, is conidered and this is regarded as a state sequence which occurs at every T seconds, $(X_1, Y_1), (X_2, Y_2), \ldots$, it is impossible to define a constant successive permutation operator which is not based on the sampling time and enables differential coding, eventually rendering differential coding impossible.

In the present differential coding system, an in-phase data sequence and a quadrature data sequence are regarded as a state sequence $(X_1, Y_1), (Y_1, X_2), (X_2, Y_2), (Y_2, X_3), \ldots$ which occurs at every T/2 seconds instead of a state sequence $(X_1, Y_1), (X_2, Y_2)$ which occurs at every T seconds. This defines the constant successive permutation operator and enables differential coding.

More detail, the present invention solves the above-discussed problem employing a mathematical technique which will be described hereafter.

Assume that a set of symbols which the original code can take is I and a set of "N" states is S, i.e.:

$$I = \{i | i = 1, 2, \ldots, N\}$$

$$S = \{s_i | i = 1, 2, \ldots, N\}$$

Let it be assumed that a given symbol $c_{ij}$ is assigned to a transition from a state $s_i$ to a state $s_j$. Then, the following N-th order square matrix C is defined:

$$C = \begin{bmatrix} c_{11} & \ldots & c_{1N} \\ \vdots & & \vdots \\ c_{N1} & \ldots & c_{NN} \end{bmatrix}$$

When the current state is $s_i$ and the original data symbol is $C_{ij}$, a state $s_j$ at the next time can be determined using the matrix C. Hence, the matrix C may be regarded as a coding matrix for determining a transmitting code and, in this sense, it will hereinafter be referred to simply as "code".

Meanwhile, when ambiguity has occured in the transmission line, states $S_1, S_2, \ldots, S_N$, for example, are transformed respectively into $s_{i1}, s_{i2}, \ldots, s_{iN}$. Let any $i_k$ be an integer lying in the range of $1 \leq i_k \leq N$. Therefore, the ambiguity in the transmission line is expressed in terms of a well known permutation operator $\sigma$:

$$\sigma = \begin{pmatrix} 1, & 2, & \ldots, & N \\ i_1, & i_2 & \ldots & i_N \end{pmatrix}$$

Assume that "L" different ambiguity elements potentially exist in the transmission line, and that permutation operators $\sigma_1, \sigma_2, \ldots, \sigma_L$ are associated with the "L" ambiguity elements, respectively. Also, when an ambiguity element $\sigma_k$ develops at a given time, an ambiguity element to develop at the next time is assumed to be determined solely by the ambiguity element $\sigma_k$ and will hereinafter be denoted by $o_k$, where - represents an operation generally referred to as a successive operation.

Based on the above preparation, a matrix operator $T_k (k = 1, 2, \ldots, L)$ is defined as shown below. Namely, assuming, for N-th order square matrices A and B, $$B = T_k(A)$$

the i-row, j-column element of the matrix A, $a_{ij}$, is equal to the $\sigma_k(i)$- row, $\sigma_k(j)$-column element of the matrix B. Here, the notation $\tilde{\sigma}_k(i)$ represents an integer provided by permutation of the integer i by a permutation operator $\sigma_k$.

For the code C to become a differential code, it is necessary and sufficient that C remains unchanged whatever the ambiguity in the transmission line may be. Expressing this in terms of the previously defined matrix operator, it may be said that C is a differential code when $T_k(C) = C$ for any $T_k$. Such formation derives differential coding theorem which will be described below. In the theorem, let $G\sigma$ be a set of permutation operators.

[Therorem]

For a differential code to exist, it is necessary and sufficient that the set of permutation operators $G\sigma$ forms an irreducible and non-separable group and, for any $\sigma_k$ and $\sigma_l \in G\sigma$, there holds an equation:

$$(\widetilde{\sigma_k \sigma_l}) = \tilde{\sigma}_l \tilde{\sigma}_k$$

At the same time, since the number of states, N, is an integral multiple of the number of ambiguity elements, L, and suitable rearrangement allows a permutation operator $\sigma_k$ to be expressed by a product $$\sigma_k = \begin{pmatrix} 1, & 2, & \ldots, & L \\ i_{11}, & i_{12}, & \ldots, & i_{1L} \end{pmatrix} \begin{pmatrix} L+1, & \ldots, & 2L \\ i_{21}, & \ldots, & i_{2L} \end{pmatrix} \begin{pmatrix} (K-1)L+1, & \ldots, & KL \\ i_{K1} & \ldots, & i_{kL} \end{pmatrix}$$

(where $i_{11} = K$), the differential code C is constructed according to $$C = \begin{bmatrix} Q_1 \\ Q_2 \\ \vdots \\ Q_k \end{bmatrix}$$

where $$Q_k = \begin{bmatrix} \tilde{\sigma}_2^{-1} & (k-1)L+1 \\ & (K-1)L+1 \\ & \vdots \\ \tilde{\sigma}_L^{-1} & (k-1)L+1 \end{bmatrix} \quad k = 1, 2, \ldots, K$$

"N" symbols should only be assigned to each of the 1st row-vectors of the respective matrices.

Assume, for example, a 2×2 SQAM transmission system wherein four different states exist, i.e. $s_1 = (+, +), s_2 = (+, -), s_3 = (-, +)$ and $s_4 = (-, -)$. It will be seen that the permutation operators $\sigma_1$–$\sigma_4$ associafted with the previously mentioned ambiguity elements are $$\sigma_1 = E, \sigma_2 = \begin{pmatrix} 1 & 2 & 3 & 4 \\ 2 & 1 & 4 & 3 \end{pmatrix}, \sigma_3 = \begin{pmatrix} 1 & 2 & 3 & 4 \\ 3 & 4 & 1 & 2 \end{pmatrix}, \sigma_4 = \begin{pmatrix} 1 & 2 & 3 & 4 \\ 4 & 3 & 2 & 1 \end{pmatrix}$$

and, therefore, successive permutation operators $\sigma_1$–$\sigma_4$ associated therewith are respectively $$\tilde{\sigma}_1 = E, \tilde{\sigma}_2 = \sigma_3, \tilde{\sigma}_3 = \sigma_2, \tilde{\sigma}_4 = \sigma_4$$

where E is the identity permutation. In this instance, the set of permutation operators $\sigma_1 = \sigma_4$, $G\sigma$, apparently forms an irreducible and non-separable group. Since $\sigma_1$–$\sigma_4$ are the inverse elements of themselves, the theorem gives a differential code C as below.

$$C = \begin{bmatrix} 1 & 2 & 3 & 4 \\ 3 & 4 & 1 & 2 \\ 2 & 1 & 4 & 3 \\ 4 & 3 & 2 & 1 \end{bmatrix}$$

Among the transitions, those from state $s_1$ to states $s_3$ and $s_4$, for example, never occur. Consequently, symbols 3 and 4 are needless to be assigned and a differential code C is obtained as below.

$$C = \begin{bmatrix} 1 & 2 & * & * \\ * & * & 1 & 2 \\ 2 & 1 & * & * \\ * & * & 2 & 1 \end{bmatrix}$$

Note that portions marked with "*" imply that assigning a code is needless.

An original data sequence 1 2 2 1 1 1 2 1 2 ...

will be subject to differential coding as will be described in accordance with the differential code C obtained as mentioned above. Assuming that the initial state at the transmitter is $s_1$, then it is understood from the differential code C that the next state developing upon generation of the symbol 1 is $s_1$. Next, since the symbol 2 has been generated in the current state $s_1$, the following state is $s_2$. Such a procedure results in a transmission state sequence $s_1$ $s_1$ $s_2$ $s_4$ $s_4$ $s_4$ $s_4$ $s_3$ $s_2$ $s_4$ ...

This derives a transmision code sequence $$\begin{cases} \text{in-phase} & + + - - + - \ldots \\ \text{quadrature} & + - - - - \ldots \end{cases}$$

Assuming the ambiguity element $(\theta, \tau) = (\pi/2, T/2)$ has acted upon the transmitting code sequence in the transmission line, then a code sequence $$\begin{cases} \text{in-phase} & \cdot - + + + + \ldots \\ \text{quadrature} & + + - - + - \ldots \end{cases}$$

is received. Representing it by a state sequence, $s_2$ $s_3$ $s_1$ $s_2$ $s_3$ $s_2$ $s_3$ $s_1$ $s_1$ $s_2$ ...

which provides the original data sequence according to the code C previously given.

Generally, a differential code C is obtainable in the same manner for an N×N SQAM transmission system. In that case, a fundamental and critical condition is that the in-phase data sequence $X_1, X_2, \ldots$ and the quadrature data sequence $Y_1, Y_2, \ldots$ be regarded totally as a state transition sequence $(X_1, Y_1), (Y_1, X_2), (X_2, Y_2), (Y_2, X_3), \ldots$ Referring to FIG. 3, a differential encoder for practicing the system of the present invention is shown which is designed specifically for use with a 2"×2" SQAM transmission system. A decoder associated with the encoder is shown in FIG. 4.

Figure 3:
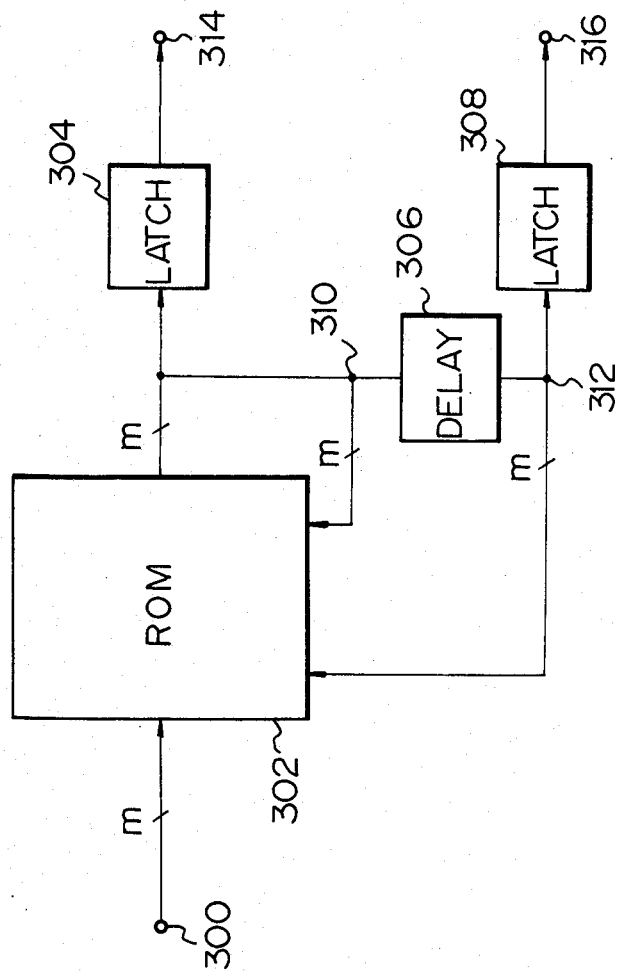
FIG. 3 is a block diagram representative of a differential coding system embodying the present invention and which is applied to a $2^m \times 2^m$ SQAM transmission system by way of example.
Figure 4:
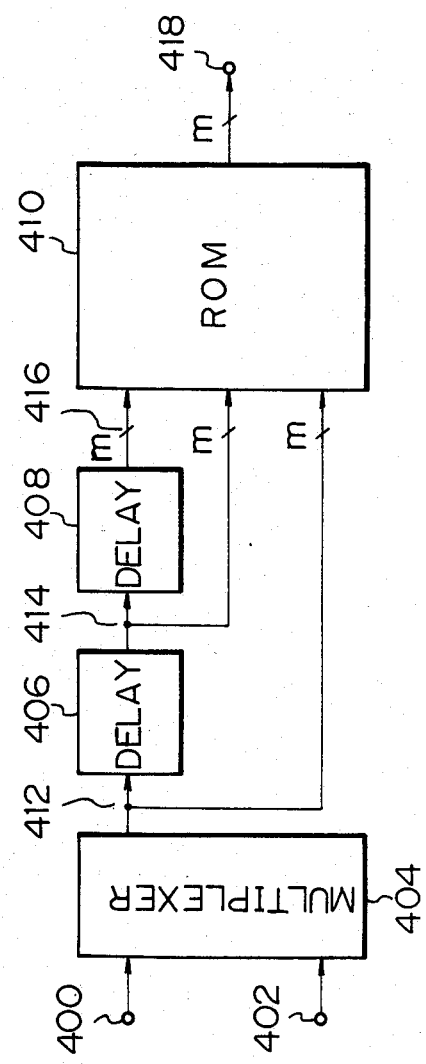
FIG. 4 is a block diagram showing an exemplary construction of a decoder associated with an encoder which is shown in FIG. 3.

In FIG. 3, the differential encoder has an input terminal 300 to which an m-bit original data sequence is applied at every T/2 seconds. A read only memory (ROM) 302 is addressed by "3m" bits to produce an m-bit symbol. The output of the ROM 302 is fed back to the ROM 302 as a part of an address and, at the same time, routed to a latch circuit 304 and a T/2-second delay circuit 306. The output of the delay circuit 306 is applied to the ROM 302 as a part of an address while being fed to a latch circuit 308.

In the above-described manner, an address of the ROM 302 is determined by "m" bits in total. Concerning the 2×2 SQAM transmission system, for example, the ROM is addressed by three bits to produce a 1-bit output. In such a case, addresses of the ROM 32 and data stored therein will be related as follows.

| ADDRESS | STORED DATA |
| --- | --- |
| 000 | 0 |
| 001 | 0 |
| 010 | 1 |
| 011 | 1 |
| 100 | 1 |
| 101 | 1 |
| 110 | 0 |
| 111 | 0 |

In the above table, the most significant bit (MSB) of each address corresponds to the original data; previously mentioned "1" is regarded 0 and "2", 1. MSB-1 of each address is a code appearing at the point 310 in FIG. 3; the previously mentioned symbol "+" is regarded 1 and "−", 0. Therefore, assuming that data in the aforementioned example is "1" at state $s_2$, producing 1 in response to the address 010 may be interpreted as a transition of the state from $s_2$ to $s_3$. The latch 304 delivers to an output terminal 314 the resulting transmission code sequence at every T/2 seconds as an in-phase data sequence appearing at every T seconds. Likewise, the latch 308 delivers to an output terminal 316 and transmitting code sequence as a quadrature data sequence appearing at every T seconds, which is delayed by T/2 seconds from the in-phase data sequence.

The decoder shown in FIG. 4 performs conversion inversely to the encoder described above with reference to FIG. 3. The decoder has an input terminal 400 supplied with an in-phase data sequence appearing at every T seconds, and an input terminal 402 supplied with a quadrature data sequence also appearing at every T seconds. A multiplexer 404 multiplexes the two sequences of data to prepare a data sequence at every T/2 seconds. The output of the multiplexer 404 is sequentially delayed by T/2 delay circuits 406 and 408. A ROM 410 is addressed by a signal made up of "3m" bits in total which appear at different points 412, 414 and 416, applying m-bit data to an output terminal 418.

In summary, it will be seen that the present invention realizes application of differential coding to an SQAM transmission system, which has heretofore been believed impracticable.

Various modifications will become possible for those skilled in the art after receiving the teachings of the present disclosure without departing from the scope thereof.

What is claimed is:

1. In a differential coding method for a staggered quadrature modulation transmission system which transmits and receives a first data sequence $a_1, a_2, \ldots, a_k, \ldots$ and a second data sequence delayed half a clock period relative to the first data sequence, $b_1, b_2, \ldots, b_k, \ldots$, by transmitting the first and second data sequences through an in-phase channel and a quadrature channel, respectively, the improvement wherein said differential coding method includes the steps of: regarding said two data sequences as a single data sequence, $a_1, b_1, a_2, b_2, \ldots, a_k, b_k, \ldots$, using said single data sequence to generate a state transition sequence, $(a_1, b_1) \rightarrow (b_1, a_2) \rightarrow (a_2, b_2) = \ldots (a_k, b_k) \rightarrow \ldots$, and assigning a data source code to the state transition between two consecutive states in conformity to a predetermined relation.

2. A differential encoder for receiving m-bit codeword in every T/2 seconds as original data and transforming the codeword into two different m-bit codeword sequences which occur at every T seconds, said differential encoder comprising:

(a) a state circuit having first, second and third inputs, said first input being supplied with m-bit original data, which is obtained at said every T/2 second, said second input being supplied with an output m-bit codeword from said state circuit; and (b) a delay circuit connected to an output of said state circuit for delaying said output m-bit codeword by T/2 seconds to produce an m-bit codeword said third input being supplied with said delayed m-bit codeword;

said state circuit including means for developing as the output m-bit codeword an m-bit pattern conforming to a relation which is predetermined by a bit pattern of "3m" bits in total which is determined at every T/2 seconds from said first, second and third inputs.

3. A differential decoder for receiving a first m-bit codeword sequence and a second m-bit codeword sequence generated at every T seconds and transforming the first and second codeword sequences into an m-bit original data codeword sequence which occurs at every T/2 seconds, said differential decoder comprising:

(a) a multiplexer for multiplexing the first and second m-bit codeword sequences according to a predetermined T/2 seconds delay relation to output a multiplexed codeword sequence as a third m-bit codeword sequence which occurs at every T/2 seconds;

(b) a first delay circuit connected to said multiplexer for delaying the third m-bit codeword sequence by T/2 seconds to output a fourth m-bit codeword sequence;

(c) a second delay circuit connected to an output of said first delay circuit for delaying the fourth m-bit codeword sequence by T/2 seconds to output a fifth m-bit codeword sequence; and (d) a state circuit responsive to said third, fourth and fifth codeword sequences as first, second and third input sequences, respectively, for developing at every T/2 seconds an m-bit codeword according to a predetermined relation to a 3m-bit input bit pattern which is determined at every T/2 seconds in said first, second and third input sequences.

* * * * *

UNITED STATES PATENT AND TRADEMARK OFFICE
CERTIFICATE OF CORRECTION

PATENT NO. : 4,661,945
DATED : April 28, 1987
INVENTOR(S) : Botaro Hirosaki

It is certified that error appears in the above-identified patent and that said Letters Patent is hereby corrected as shown below:

IN THE SPECIFICATION

Column 1, line 19 - Delete "sftate" and insert --state--

Column 2, line 15 - Delete ~sftate" and insert --state--

Column 4, line 9 - Delete "." insert --,-- line 40 - Delete "samples" insert --implies-- line 56 - Delete "as" insert --an-- line 64 - Delete "$(\varphi,\pi)$ insert --$(\varphi,T)$--

Column 5, line 2 - Delete "conidered" insert --considered-- line 66 - Delete "$o_k$" insert --$\tilde{\sigma}'_k$--

Column 6, line 8 - Delete "$\sigma'_k(j)$" insert --$\tilde{\sigma}'_k(j)$-- line 9 - Delete "$\tilde{\sigma}'_k(i)$" insert --$\sigma'_k(i)$ line 17 - Delete "formation" insert --formulation--

UNITED STATES PATENT AND TRADEMARK OFFICE
CERTIFICATE OF CORRECTION

PATENT NO. : 4,661,945

DATED : April 28, 1987

INVENTOR(S) : Botaro Hirosaki

It is certified that error appears in the above-identified patent and that said Letters Patent is hereby corrected as shown below:

Column 6, line 22 - Delete "[Therorem]" insert --[Theorem]--

Column 7, line 6 - Delete "$\sigma'_1 - \sigma'_4$" insert --$\tilde{\sigma}_1 - \tilde{\sigma}_4$--

Column 8, line 26 - After "bits" delete "in total" insert --of the original data, "m" bits of a symbol appearing at a point 310, and "m" bits of a symbol appearing at a point 312, "3m" bits in total.-- line 28 - After "ROM" insert --302-- line 29 - After "ROM" delete "32" insert --302--

IN THE CLAIMS

Column 9, line 14 - After "quadrature" insert --amplitude--
(Claim 1)

Column 9, line 25 - After "$b_2$)" delete "="

Signed and Sealed this

Twenty-sixth Day of January, 1988

*Attest:*

DONALD J. QUIGG

*Attesting Officer*      *Commissioner of Patents and Trademarks*